United States Patent
Maeno

(10) Patent No.: US 9,274,211 B2
(45) Date of Patent: Mar. 1, 2016

(54) TARGET OBJECT DETECTING DEVICE AND ECHO SIGNAL PROCESSING METHOD

(71) Applicant: Furuno Electric Co., Ltd., Nishinomiya (JP)

(72) Inventor: Hitoshi Maeno, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 310 days.

(21) Appl. No.: 13/923,295

(22) Filed: Jun. 20, 2013

(65) Prior Publication Data

US 2013/0342382 A1    Dec. 26, 2013

(30) Foreign Application Priority Data

Jun. 21, 2012  (JP) .................................. 2012-139388
Apr. 23, 2013  (JP) .................................. 2013-090266

(51) Int. Cl.
| G01S 7/28 | (2006.01) |
|---|---|
| G01S 7/292 | (2006.01) |
| G01S 7/41 | (2006.01) |
| G01S 13/524 | (2006.01) |
| G01S 13/93 | (2006.01) |
| G01S 13/42 | (2006.01) |

(52) U.S. Cl.
CPC .............. *G01S 7/2927* (2013.01); *G01S 7/2813* (2013.01); *G01S 7/292* (2013.01); *G01S 7/2922* (2013.01); *G01S 13/5246* (2013.01); *G01S 13/9307* (2013.01); *G01S 7/414* (2013.01); *G01S 13/426* (2013.01); *G01S 13/5244* (2013.01)

(58) Field of Classification Search
CPC ................ G01S 7/2813; G01S 7/292–7/2927; G01S 7/34; G01S 7/414; G01S 13/5242; G01S 13/5244

USPC ..................................... 342/93, 159–164, 205
See application file for complete search history.

(56) References Cited

U.S. PATENT DOCUMENTS

| 4,213,127 A * | 7/1980 | Cole ............................... 342/93 |
| 4,386,353 A * | 5/1983 | Bleijerveld et al. ............. 342/91 |
| 4,503,432 A * | 3/1985 | Bailey ............................. 342/93 |
| 4,780,720 A * | 10/1988 | Watts .............................. 342/91 |
| 4,837,579 A * | 6/1989 | Pease et al. ................... 342/197 |

(Continued)

OTHER PUBLICATIONS

Sekine, Matsuo, "Radar Signal Processing Technology", Chapter 5, pp. 96-99, The Institute of Electronics, Information and Communication Engineers, Sep. 20, 1991, 12 pages.

*Primary Examiner* — Peter Bythrow
(74) *Attorney, Agent, or Firm* — Alleman Hall McCoy Russell & Tuttle LLP

(57) ABSTRACT

A target object detection device is provided. The device includes a transmitter for transmitting at least one transmission wave in a predetermined azimuth, an echo signal receiver for receiving echo signals of the transmission waves, an echo signal suppressor for suppressing levels of the echo signals corresponding to sampling positions, a target object detector for detecting the target object(s) based on the level-suppressed echo signals, a first updater for comparing amplitude level(s) of echo signals of sampling positions, with the threshold that is set in association with the first distance, and determining to update the values with a new threshold and a new suppression value, and a second updater for comparing amplitude level(s) of echo signals of sampling positions, with the threshold that is set in association with the second distance, and determining to update the values with a new threshold and a new suppression value.

21 Claims, 16 Drawing Sheets

(56) References Cited

U.S. PATENT DOCUMENTS

| | | | |
|---|---|---|---|
| 4,845,500 A * | 7/1989 | Cornett et al. | 342/90 |
| 5,280,289 A * | 1/1994 | Root | 342/91 |
| 5,337,055 A * | 8/1994 | Ghignoni | 342/93 |
| 5,357,256 A * | 10/1994 | Peperone | 342/160 |
| 5,488,377 A * | 1/1996 | Reynolds et al. | 342/93 |
| 5,539,412 A * | 7/1996 | Mendelson | 342/192 |
| 5,644,315 A * | 7/1997 | Long | 342/93 |
| 5,949,368 A * | 9/1999 | DeCesare | 342/93 |
| 7,336,219 B1 * | 2/2008 | Lohmeier et al. | 342/159 |
| 7,705,730 B2 * | 4/2010 | Royer | 340/552 |
| 7,990,309 B2 * | 8/2011 | Watts | 342/93 |
| 8,013,781 B2 * | 9/2011 | Stockmann | 342/93 |
| 2008/0030401 A1 * | 2/2008 | Kojima et al. | 342/185 |
| 2008/0169966 A1 * | 7/2008 | Tsuchihashi et al. | 342/70 |
| 2008/0191929 A1 * | 8/2008 | Wood | 342/73 |
| 2008/0218339 A1 * | 9/2008 | Royer | 340/552 |
| 2009/0058713 A1 * | 3/2009 | Okunishi et al. | 342/91 |
| 2009/0096662 A1 * | 4/2009 | Wang et al. | 342/93 |
| 2009/0315757 A1 * | 12/2009 | Watts | 342/93 |
| 2010/0073218 A1 * | 3/2010 | Stockmann | 342/146 |
| 2010/0321231 A1 * | 12/2010 | Nakahama | 342/118 |
| 2011/0291877 A1 * | 12/2011 | Habboosh et al. | 342/159 |
| 2012/0007767 A1 * | 1/2012 | Maeno | 342/92 |
| 2012/0154204 A1 * | 6/2012 | Wood | 342/159 |

* cited by examiner

TARGET OBJECT DETECTING DEVICE AND ECHO SIGNAL PROCESSING METHOD

CROSS-REFERENCE TO RELATED APPLICATION(S)

The application claims priority under 35 U.S.C. §119 to Japanese Patent Application No. 2012-139388, which was filed on Jun. 21, 2012, and Japanese Patent Application No. 2013-090266, which was filed on Apr. 23, 2013, the entire disclosure of which are hereby incorporated by references.

TECHNICAL FIELD

The present invention relates to a target object detecting device and an echo signal processing method for setting a threshold used to suppress an unnecessary component in detection data, and suppressing the unnecessary component based on the set threshold.

BACKGROUND OF THE INVENTION

Conventional target object detection devices transmit radio waves for detection and detect target objects based on echo signals of the transmitted radio waves. As one kind of such target object detection devices, a radar equipped in a ship and for detecting a target object (e.g., another ship on the sea) and a land by transmitting and receiving electromagnetic waves by an antenna has been known. With the radar, unnecessary components caused by, for example, a sea surface reflection echo (sea clutter) is suppressed so that the target objects (e.g., the other ship and land) are easily distinguished. Here, a threshold is set to determine whether the echo signal is an unnecessary component, and determine a suppressing amount of the echo signal.

As a conventional threshold setting method, a method so called CFAR processing (Constant False Alarm Rate processing) has been known, which calculates a moving average using a group of echo signals in a distance direction, in other words, in a direction away from an antenna position (see Sekine Matsuo, "Radar Signal Processing Techniques" The Institute of Electronics, Information and Communication Engineers, Sep. 20, 1991).

However, sea surface reflection echoes have a characteristic in which a level difference generally becomes larger as a distance from a radar apparatus (a ship) is shorter. Therefore, even when the CFAR processing is used, a threshold level will be set as an average value of levels of the sea surface reflection echoes. Therefore, the sea surface reflection echoes cannot be suppressed appropriately by using such a threshold. Particularly, when the sea surface reflection echo has a high signal level, the suppressing effect is low.

SUMMARY OF THE INVENTION

Thus, the present invention is made in view of the above situation, and sets a threshold with which an unnecessary component caused by, for example, a sea surface reflection echo can be suppressed appropriately.

According to an aspect of the invention, a target object detecting device is provided. The device includes a transmitter, an echo signal receiver, an echo signal suppressor, a target object detector, a first updater, and a second updater. The transmitter transmits at least one transmission wave in a predetermined azimuth from a transmission source thereof at a predetermined cycle. The echo signal receiver receives echo signals of the transmission waves from one or more target objects at the cycle. The echo signal suppressor suppresses levels of the echo signals corresponding to sampling positions every time the echo signals are received at the cycle, by using setting of amplitude level suppression values of the echo signals based on thresholds for the sampling positions that are set in association with distances from the transmission source. The target object detector detects the one or more target objects based on the level-suppressed echo signals. The first updater compares one or more amplitude levels of echo signals of sampling positions within a first area corresponding to a first distance from the transmission source, with the threshold that is set in association with the first distance, and determines to update the values with a new threshold and a new suppression value for each sampling position corresponding to the first distance based on the comparison result. The second updater compares one or more amplitude levels of echo signals of sampling positions corresponding to a second distance that is farther than the first distance from the transmission source, with the threshold that is set in association with the second distance, and determines to update the values with a new threshold and a new suppression value for each sampling position located farther than the first distance based on the comparison result and a relation with the threshold for each sampling position located farther than the first area.

With this configuration, the threshold for suppressing an unnecessary component of the echo signals can be suitably set in the first and second areas having different transition properties of the amplitude level, respectively. The unnecessary component can be properly suppressed by subtracting the threshold or the suppression value set corresponding to the threshold, from the echo signal level.

The first updater may compare amplitude levels of echo signals of a plurality of sampling positions within the first area including the one or more sampling positions at the first distance, with the thresholds for the plurality of sampling positions, respectively, and determine the new threshold and suppression value for each sampling position at the first distance. The second updater may compare amplitude levels of echo signals of a plurality of sampling positions within a second area including the one or more sampling positions corresponding to the second distance, with the thresholds for the plurality of sampling positions, respectively, and determine the new threshold and suppression value for each sampling position located farther than the first distance.

With this configuration, the threshold is set for each of the first and second distances based on the echo signals of the plurality of sampling points. In this manner, a further suitable threshold can be set for various states of the sea.

The transmission source may transmit the transmission waves at a transmission cycle shorter than the predetermined cycle while changing the transmission azimuth, the transmission azimuth including the predetermined azimuth. The plurality of sampling positions within the first area may include a plurality of sampling positions at the first distance. The plurality of sampling positions within the second area may include a plurality of sampling positions at the second distance.

Also with this configuration, the threshold is set for each of the first and second distances based on the echo signals of the plurality of sampling points. In this manner, a further suitable threshold for the sea state can be set.

In the threshold determination by the first updater, each of the amplitude levels of the echo signals of the plurality of sampling positions within the first area may be compared with the threshold for the corresponding sampling position, the number of sampling positions exceeding the threshold may be counted to obtain a first counted number, and the threshold and suppression value for each sampling position at the first distance may be updated based on the first counted number. In the threshold determination by the second updater, each of the amplitude levels of the echo signals of the plurality of sampling positions within the second area may be compared with the threshold for the corresponding sampling position, the number of sampling positions exceeding the threshold may be counted to obtain a second counted number, and the threshold and suppression value for each sampling position at the second distance may be updated based on the second counted number.

This configuration shows a specific setting mode of the threshold.

The first updater may set the threshold and suppression value for each sampling position at the first distance to be larger as the first counted number is larger. The second updater may set the threshold and suppression value for each sampling position within the second area to approach an amplitude level of an echo signal corresponding thereto.

The second updater may include a primary IIR filter for determining a gain based on the comparison result, passing each echo signal of the sampling position within the second area therethrough, and setting the threshold and suppression value for the sampling position.

This configuration shows a further specific setting mode of the threshold, and in detail, the mode using a primary IIR filter is indicated.

The device may further include a third updater. The third updater may compare one or more amplitude levels of echo signals of sampling positions corresponding to a third distance that is farther than the second distance from the transmission source, with the threshold that is set in association with the third distance, and determine to update the values with a new threshold and a new suppression value for each sampling position within a third area located farther than the second distance based on the comparison result and a relation with the threshold for each sampling position located farther than the second distance.

With this configuration, the threshold is set by using an echo signal of the third distance in addition to the echo signal of the second distance. In this manner, a further suitable threshold for the sea state can be set.

The third updater may include a primary IIR filter for determining a gain based on the comparison results obtained by the second and third updaters, passing each echo signal of the sampling position located farther than the first distance therethrough, and setting the threshold and suppression value for the sampling position.

With this configuration, a further specific setting mode of the threshold in a case of also using the echo signal of the third distance is indicated, and in detail, the mode using a primary IIR filter is indicated.

The suppression of the echo signal may be performed using the threshold for each sampling position as the suppression value for the sampling position.

With this configuration, the threshold is used as the suppression value as it is, and thus, the setting of the suppression value becomes easy.

The device may further include an antenna for transmitting pulse waves while rotating at the predetermined cycle as the transmission source, and a display unit for displaying the one or more target objects detected based on the echo signals obtained from the suppression.

This configuration shows a case where a radar apparatus is used as the target object detecting device.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Hereinafter, a radar apparatus according to a first embodiment of the invention is described in detail with reference to the accompanying drawings.

In this embodiment, a threshold to be set is for suppressing a sea surface reflection echo obtained by a pulse-shaped signal which is transmitted from an antenna of the radar apparatus, reflecting on a sea surface. Note that, without limiting to the sea surface reflection echoes, the following processing and configuration can be applied to any unnecessary component as long as it shows an amplitude characteristic in which an amplitude level decreases averagely as a distance from the radar apparatus (the center of the transmission source of the pulse signal) is farther.

Figure 1:
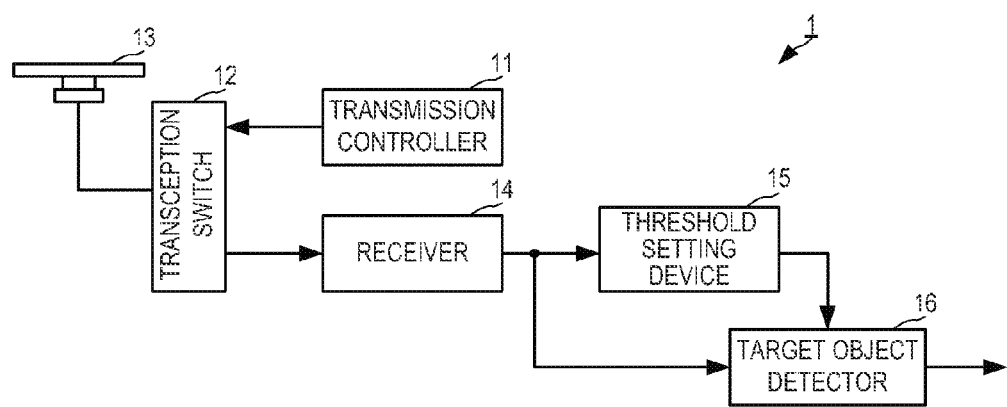
FIG. 1 is a block diagram showing a configuration of a radar apparatus 1 according to a first embodiment of the invention.
Figure 2:
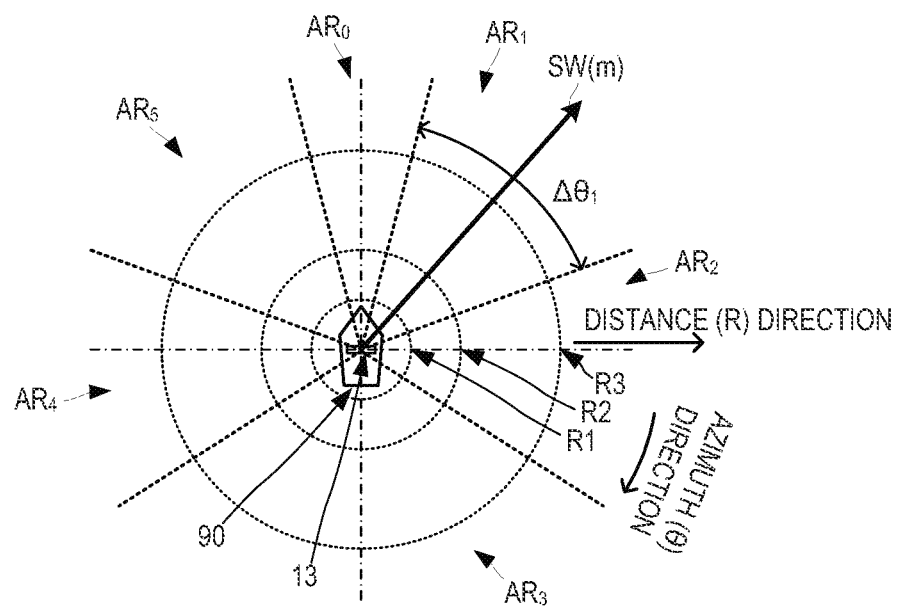
FIG. 2 is a view showing distance and azimuth setting concepts of a method of setting a threshold according to the first embodiment of the invention.

FIG. 1 is a block diagram showing a configuration of a radar apparatus 1 according to this embodiment of the invention. FIG. 2 is a view showing distance and azimuth setting concepts of a method of setting a threshold by the radar apparatus 1 according to this embodiment of the invention.

The radar apparatus 1 includes a transmission controller 11, a transception switch 12, an antenna 13, a receiver 14, a threshold setting device 15, and a target object detector 16. The transmission controller 11, the transception switch 12, and the antenna 13 correspond to the transmitter in the claims, and the receiver 14 corresponds to the echo signal receiver in the claims. Moreover, the threshold setting device 15 corresponds to the first, second, and third updaters in the claims. The target object detector 16 corresponds to the target object detector in the claims, and also, in conjunction with the threshold setting device 15, corresponds to the echo signal suppressor in the claims.

The transmission controller 11 generates pulse-shaped signals at predetermined transmission timing intervals and transmits the signals to the transception switch 12. The transception switch 12 outputs the pulse-shaped signal from the transmission controller 11 to the antenna 13.

The antenna 13 transmits the pulse-shaped signals to the outside while rotating at a predetermined rotation cycle. Moreover, the antenna 13 receives echo signals obtained by the pulse-shaped signals reflecting on, for example, a sea surface and a target object, and outputs them to the transception switch 12. The transception switch 12 outputs the echo signals from the antenna 13 to the receiver 14.

The receiver 14 samples the echo signals at predetermined time intervals and generates detection data Dd for each sweep SW. Data for a single sweep is formed of a group of a plurality of detection data arranged in a distance direction at distance intervals based on the predetermined time intervals (sampling intervals). For each sweep SW, the receiver 14 outputs the sweep data (detection data group) to the threshold setting device 15 and the target object detector 16.

Here, an azimuth of each sweep SW is, for example, an absolute azimuth set based on azimuth angle information at the transmission timing of each pulse-shaped signal from the antenna 13 (a specific direction, such as a ship heading, is set as a reference azimuth), and the ship heading of a ship 90 equipped with the radar apparatus 1 therein. The azimuth of the sweep is also given to the threshold setting device 15 and the target object detector 16.

Although the specific configuration and processing is described later, the threshold setting device 15 compares detection data levels with threshold levels at a plurality of positions in the distance direction for an observing sweep. Here, in a detection area, the plurality of positions are set within an area comparatively close to the antenna 13 where the sea surface reflection easily occurs. Based on the comparison results at the plurality of positions, the threshold setting device 15 determines each of the threshold levels of the sampling positions in the distance direction to adapt to an amplitude level of a sea surface reflection echo while updating the threshold level for every scan (every time the antenna 13 rotates once, that is 360°). Specifically, the threshold levels of the sampling positions are adapted in a unit of scan. The adapted threshold levels are used for sea surface reflection suppression. The threshold setting device 15 uses the adapted sea surface reflection suppression threshold levels of the sampling positions in the next update, as well as outputs them to the target object detector 16. Each of the sea surface reflection suppression threshold levels corresponds to a threshold level for unnecessary component suppression.

The target object detector 16 performs a target object detection based on the detection data from the receiver 14 and the sea surface reflection suppression threshold levels. The target object detection includes target object detection processing and detection image data formation processing. The target object detection processing is, for example, processing in which when the level of detection data is higher than a threshold level for target object detection, the detection data is determined to be caused by the target object, and the determination result is outputted. The detection image data formation processing is processing of forming the detection image data in which only the detection data above a predetermined threshold level appears more distinctively by suppressing the detection data below the predetermined threshold level. The target object detector 16 may include a display unit for displaying the detection image data and/or the determination result of the target object detection (not illustrated).

Therefore, when the target object detection is performed, the target object detector 16 firstly performs sea surface reflection suppression on the detection data from the receiver 14 using the sea surface reflection suppression threshold level set by the threshold setting device 15. Specifically, the target object detector 16 compares the sea surface reflection suppression threshold level with the detection data level for each of the sampling positions in the distance direction, and only leaves the detection data higher than the sea surface reflection suppression threshold level. Then, when the detection data exists, which exceeds the target object detection threshold level that is separately set and does not depend on the position in the distance direction, the target object detector 16 determines that the target object exists at the corresponding sampling position.

When the detection image data formation processing is performed, the target object detector 16 uses the sea surface reflection suppressing threshold level set by the threshold setting device 15, as a threshold level for detection image data formation processing. Moreover, the target object detector 16 compares the sea surface reflection suppression threshold level with the detection data level of each of the sampling positions in the distance direction, and generates the detection image data where the detection data above the sea surface reflection suppression threshold level remains. For example, the detection image data can be generated by subtracting the threshold level from the detection data level for each sampling position.

The threshold setting device 15 performs the update of the threshold level adapted to the state of the sea; thus, the target object echo can be detected more accurately from the detection data including the sea surface reflection echo (unnecessary component) and the target object echo, and the detection image data in which the image of the target object is more accurately and clearly be shown can be generated.

Figure 3:
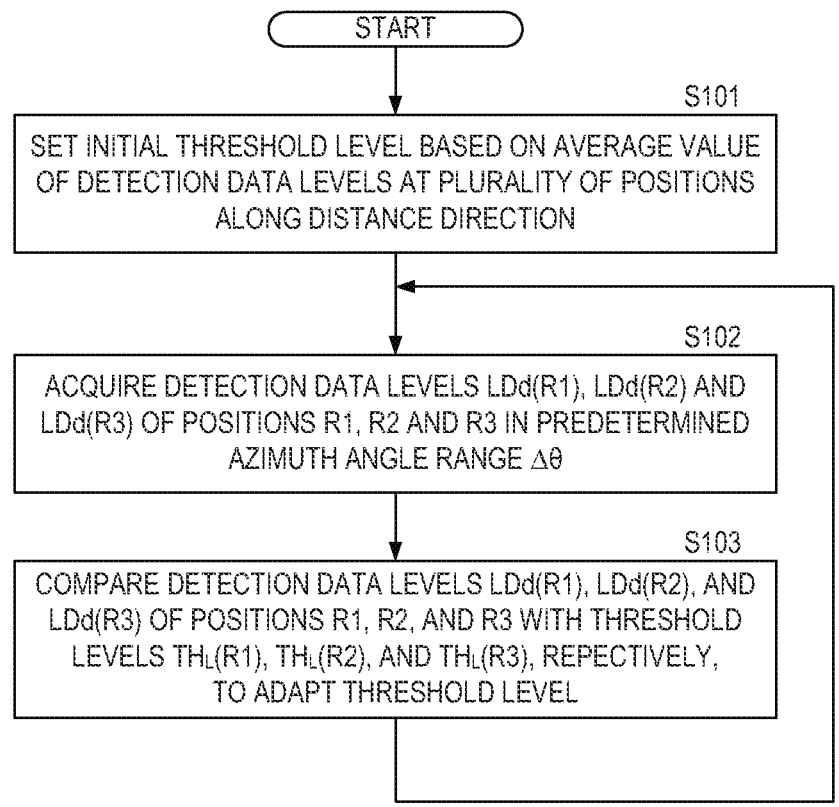
FIG. 3 is a flowchart showing the threshold setting method according to the first embodiment of the invention.
Figure 4:
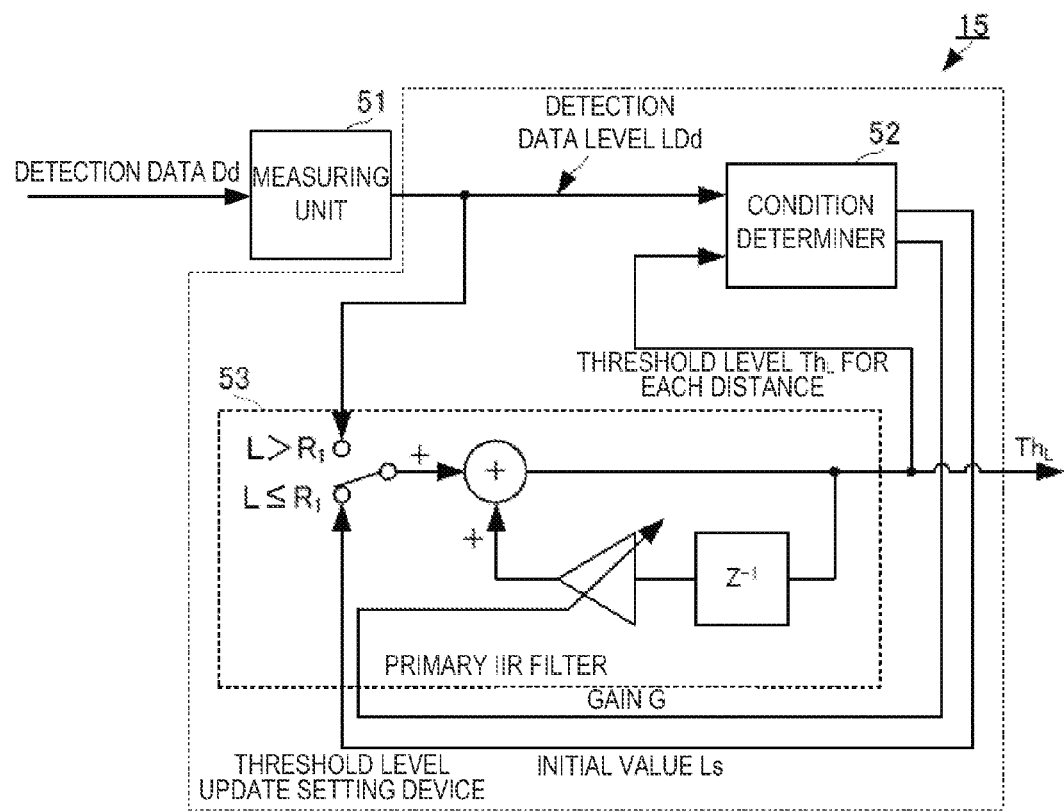
FIG. 4 is a block diagram showing a configuration of a threshold setting device 15.
Figure 5:
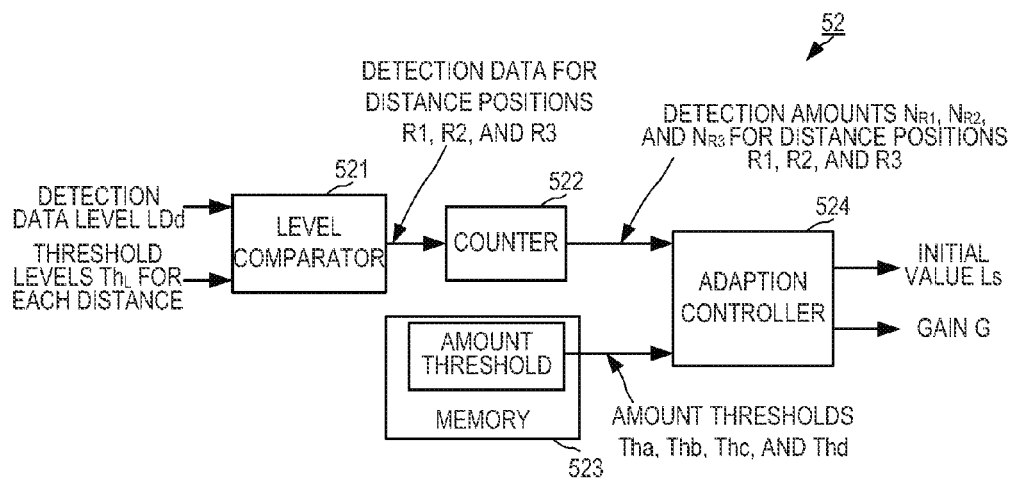
FIG. 5 is a block diagram showing a configuration of a condition determiner 52.

Next, the specific processing and configuration of the threshold setting device 15 are described. The threshold setting device 15 performs processing according to the following flow shown in FIG. 3, and has a configuration shown in FIGS. 4 and 5. FIG. 3 is a flowchart showing a threshold setting method according to the first embodiment of the invention. FIG. 4 is a block diagram showing the configuration of the threshold setting device 15. FIG. 5 is a block diagram showing a configuration of a condition determiner 52.

The threshold setting device 15 firstly sets, based on average values of detection data levels of a plurality of positions, initial threshold levels for the respective sampling positions before the adaption (S101). Specifically, the threshold setting device 15 acquires detection data levels LDd in a predetermined azimuth range at a first position R1, a second position R2, and a third position R3, respectively. The azimuth range may be a predetermined range including the observing sweep (e.g., an azimuth range $AR_1$, that is the azimuth angle range $\Delta\theta_1$, when the observing sweep is a sweep SW(m) as shown in FIG. 2) may be specified, or an entire circumferential direction (corresponding to the one rotation of the antenna 13 may be specified). The threshold setting device 15 calculates the average value of the detection data levels LDd obtained in the specified azimuth range, for each position.

Here, as shown in FIG. 2, the first position R1 is close to the antenna 13 (near position). The second position R2 is far from the antenna 13 compared to the first position R1 (intermediate position). The third position R3 is farther from the antenna 13 than the first and second positions R1 and R2 (far position).

The area including the first position R1 but not including the second and third positions R2 and R3, and close to the antenna 13 corresponds to the first area in the claims. The area including the second position R2 but not including the first and third positions R1 and R3, and farther from the antenna 13 than the first position R1 corresponds to the second area in the claims. The area including the third position R3 but not including the first and second positions R1 and R2, and farther from the antenna 13 than the first and second positions R1 and R2 corresponds to the third area in the claims. Specifically, the first position R1 may be set to be near the farther end of a main bang of the sea surface reflection echo. The second position R2 may be at around 100 [m] from the antenna 13. The third position R3 may be at around 500 [m] from the antenna 13.

These positions can be set by an operator through a user interface (not illustrated). Moreover, these positions may suitably be set and changed according to a power of the pulse-shaped signal or the state of the sea.

Figure 6:
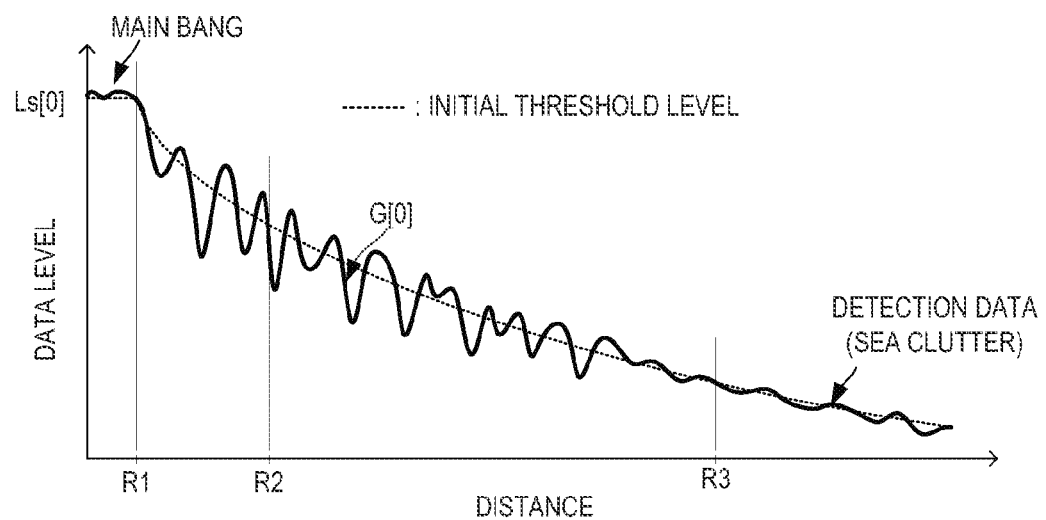
FIG. 6 is a chart showing a concept of setting an initial threshold curve (before adaption)

The threshold setting device 15 sets initial threshold levels $Th_L$ for the respective sampling positions by using average values of the detection data levels LDd of the first, second and third positions R1, R2 and R3. FIG. 6 is a chart showing a concept of setting the initial threshold level. The dotted line in FIG. 6 shows threshold curve obtained by continuously connecting the threshold levels of the sampling positions in the distance detection.

After calculating the average value of the detection data levels LDd(R1) of the first position R1, the threshold setting device 15 sets the average value as an initial value Ls[0] of a primary IIR filter set by a transfer function $H[nT]=Ls \times e^\alpha$ ($\alpha<1$). In other words, the threshold level in the area close to the antenna 13 is set. After calculating the average value of the detection data levels LDd(R2) of the second position R2 and the average value of the detection data levels LDd(R3) of the third position R3, the threshold setting device 15 estimates to set a gain $G[0]=e^\alpha[0]$ of the primary IIR filter based on these average values. Moreover, the threshold setting device 15 sets the output value of the primary IIR filter set as described above, to be the initial threshold level $Th_L$ of the sampling position.

When the adaption of the threshold level of the sampling position is started, the threshold setting device 15 acquires the detection data levels LDd(R1), LDd(R2) and LDd(R3) of the first, second and third positions R1, R2 and R3 in each of the sweeps in a predetermined azimuth angle range $\Delta\theta$ with respect to the observing sweep SW (S102).

The threshold setting device 15 compares each detection data level LDd(R1) of the first position R1 with the threshold level $Th_L(R1)$, each detection data level LDd(R2) of the second position R2 with the threshold level $Th_L(R2)$, and each detection data level LDd(R3) of the third position R3 with the threshold level $Th_L(R3)$, respectively. Based on the comparison results, the threshold setting device 15 performs the adaption of the threshold levels for the respective positions (S103).

Although the detailed method and configuration are described later, to describe briefly, based on the comparison results, the threshold setting device 15 adapts the setting values (initial value and gain) for determining the threshold level for each sampling position so that the threshold level of each sampling position substantially matches with an envelope (envelope of a maximum peak) of the levels of the sea surface reflection echoes obtained from the detection data levels.

Such adaption of the threshold level for each sampling position is performed for, for example, every sweep. Here, the setting of the initial value and the setting of the gain for each sweep are performed continuously and instantly. In other words, the setting of the initial value and the setting of the gain for one sampling position completes in the scan where the detection data of the same sampling position is obtained, without depending on detection data from another scan. Moreover, the threshold levels of each sweep are adapted repeatedly in each scan.

Next, the specific configuration for performing the adaption on the threshold level for each sampling position described above and the specific contents of the adaption are described.

The threshold setting device 15 includes a measuring unit 51, the condition determiner 52, and a primary IIR filter 53.

The measuring unit 51 detects data levels (corresponding to the amplitude) of the detection data Dd inputted in the unit of sweep data and outputs the detection data levels LDd for each position (sampling position) in the distance direction to the condition determiner 52.

The primary IIR filter 53 uses either one of the initial value Ls after the update by the condition determiner 52 and the detection data level LDd of each sampling position as an input signal, sets the gain G after the update by the condition determiner 52 as a feedback gain, and performs filtering. The output of the primary IIR filter 53 becomes the threshold level $Th_L$ for each of the positions sequentially aligned in the distance direction. Further, by using the primary IIR filter using such an input signal and the gain, the threshold level adapted to the detection data level (sea surface reflection echo levels) of each sampling position can be set. Moreover, by using the primary IIR filter 53, the threshold level $Th_L$ of each position which is adapted to the characteristic of the sea surface reflection echo can be set with simple configuration and fewer condition setting. The set threshold level $Th_L$ is outputted to the condition determiner 52 as well as the target object detector 16 as described above.

The condition determiner 52 has a level comparator 521, a counter 522, a storage 523, and an adaption controller 524.

The level comparator 521 is inputted with the detection data levels LDd and the threshold levels $Th_L$ of the sampling positions outputted from the primary IIR filter 53. The level comparator 521 compares the detection data levels LDd with the threshold levels $Th_L$ of the first, second and third positions R1, R2 and R3, respectively.

More specifically, the level comparator 521 compares the detection data level LDd(R1) of the first position R1 with the threshold level $Th_L(R1)$ for each of a plurality of sweeps including the observing sweep SW and aligned in the azimuth direction in a predetermined azimuth range.

For example, in the example of FIG. 2, the level comparator 521 compares the detection data level LDd(R1) of the first position R1 with the threshold level $Th_L(R1)$ for each of a plurality of sweeps in an azimuth range $AR_1$ (azimuth angle range $\Delta\theta_1$) including the observing sweep SW(m). When the detection data level LDd(R1) is above the threshold level Th$_L$(R1), the level comparator 521 outputs detection data "1(R1)." This processing is performed in every sweep.

The level comparator 521 compares the detection data level LDd(R2) of the second position R2 with the threshold level Th$_L$(R2) for each of the plurality of sweeps in the azimuth range AR$_1$ (azimuth angle range Δθ$_1$) including the observing sweep SW(m). When the detection data level LDd(R2) is above the threshold level Th$_L$(R2), the level comparator 521 outputs detection data "1(R2)." This processing is performed in every sweep.

The level comparator 521 compares the detection data level LDd(R3) of the third position R3 with the threshold level Th$_L$(R3) for each of the plurality of sweeps in the azimuth range AR$_1$ (azimuth angle range Δθ$_1$) including the observing sweep SW(m). When the detection data level LDd(R3) is above the threshold level Th$_L$(R3), the level comparator 521 outputs detection data "1(R3)." This processing is performed in every sweep.

The counter 522 counts the amount of detection data for each of the first, second and third positions R1, R2 and R3 to calculate the detected amounts N$_{R1}$, N$_{R2}$ and N$_{R3}$. The counter 522 outputs the detected amounts N$_{R1}$, N$_{R2}$ and N$_{R3}$ to the adaption controller 524.

The detected amounts N$_{R1}$ is the amount of detection data "1(R1)" at the first position R1 in the range of the predetermined azimuth angles Δθ including the observing sweep. The detected amounts N$_{R2}$ is the amount of detection data "1(R2)" at the second position R2 in the predetermined azimuth angle range including the observing sweep. The detected amounts N$_{R3}$ is the amount of detection data "1(R3)" at the third position R3 in the predetermined azimuth angle range including the observing sweep.

Amount thresholds Tha, Thb, Thc and Thd are stored in the memory 523 and are read by the adaption controller 524. The amount thresholds Tha, Thb, Thc and Thd are suitably set according to the size of the azimuth angle range Δθ.

The adaption controller 524 uses the detected amounts N$_{R1}$, N$_{R2}$ and N$_{R3}$ and the amount thresholds Tha, Thb, Thc and Thd to determine the initial value Ls and the gain G of the primary IIR filter 53 for updating the threshold level, for each sampling position. The determination of the initial value Ls and the gain G is performed continuously and instantly.

Figure 7:
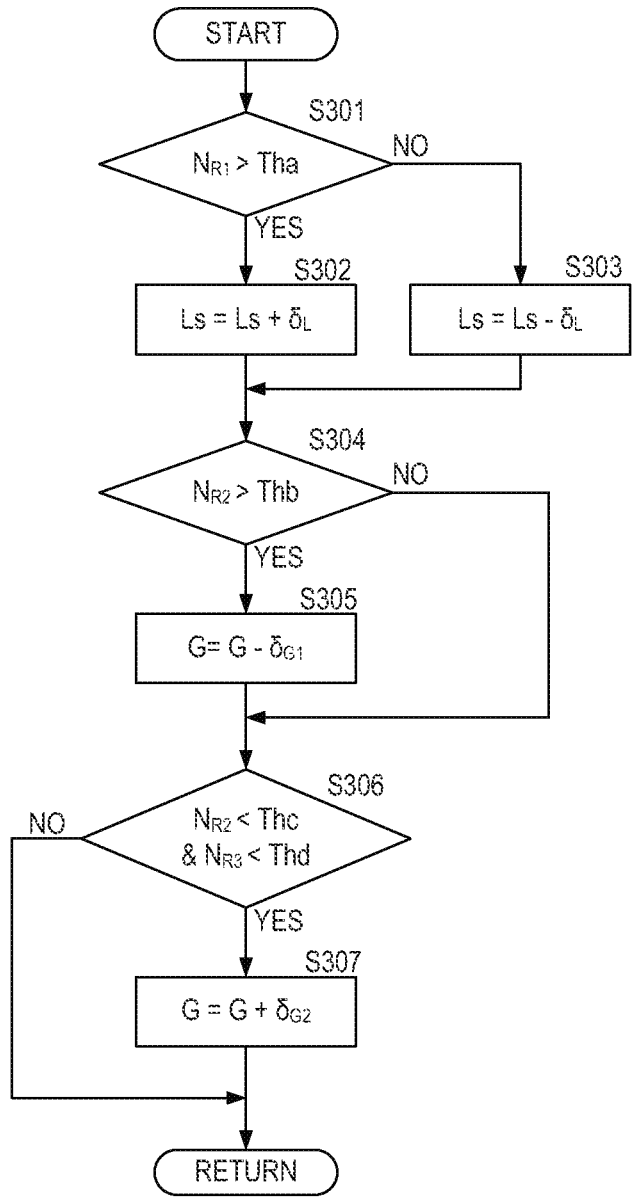
FIG. 7 is a flowchart showing a flow of updating the threshold curve by an adaption controller 524.
Figure 8A:
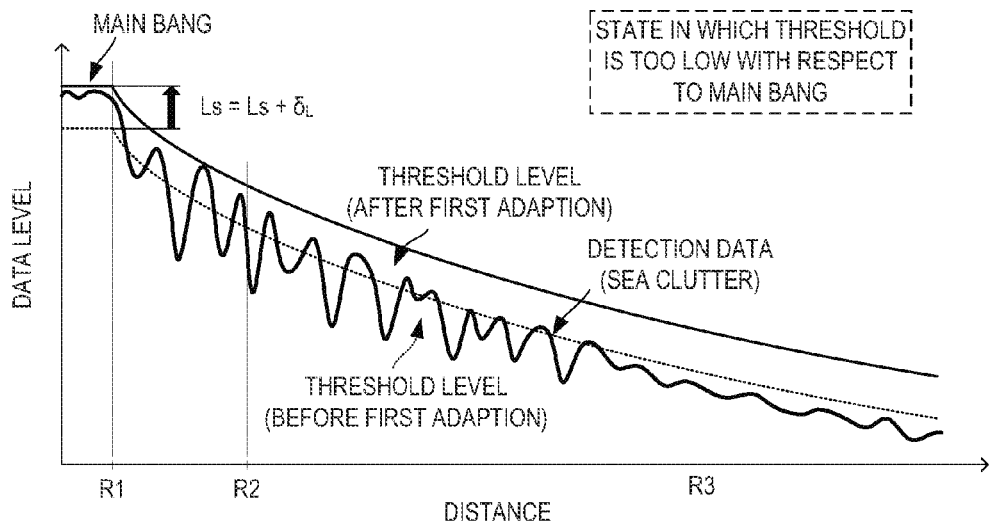
FIGS. 8A and 8B are charts showing a concept of a first adaption in which an initial value Ls is adapted based on a result from a first position R1.
Figure 8B:
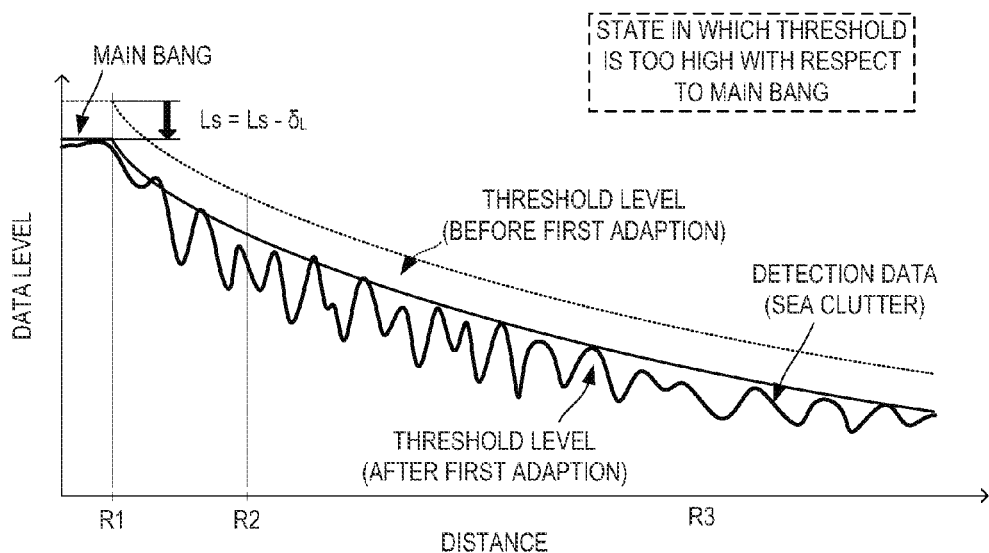
Figure 9:
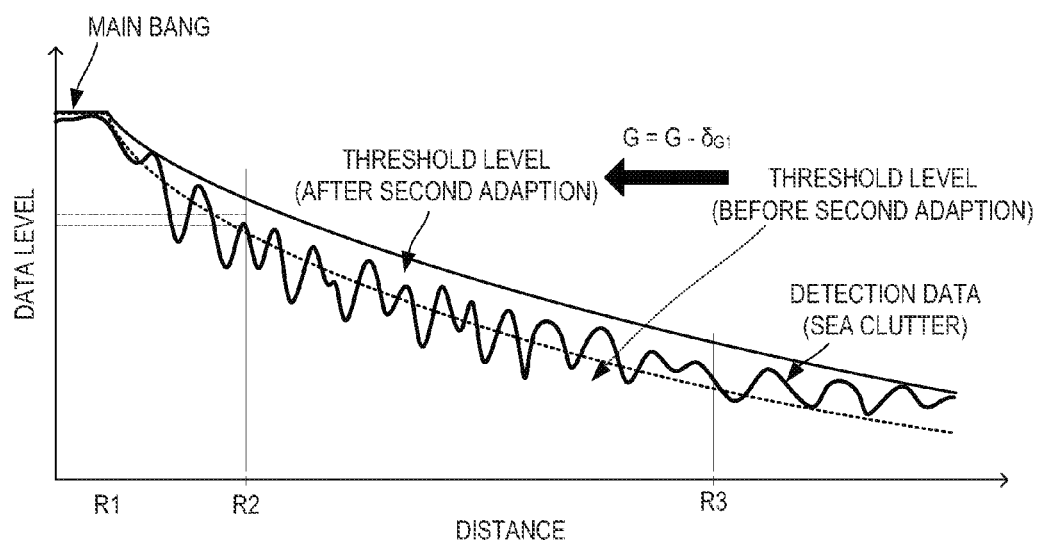
FIG. 9 is a chart showing a concept of a second adaption in which a gain G is adapted based on a result from the second position R2.
Figure 10:
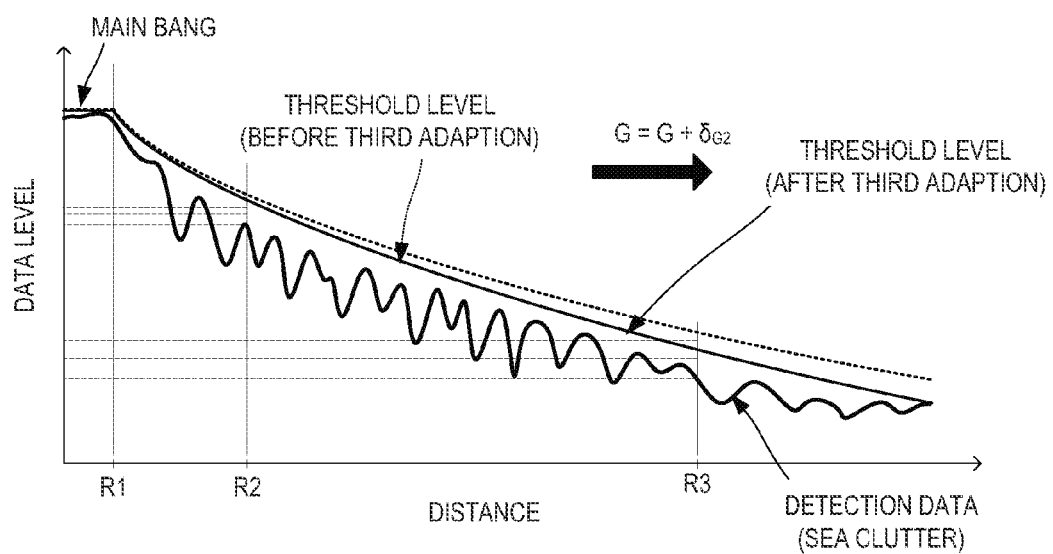
FIG. 10 is a chart showing a concept of a third adaption in which the gain G is adapted based on results from second and third positions R2 and R3.

FIG. 7 is a flowchart showing a flow of updating (adapting) the threshold level by the adaption controller 524. FIG. 8A is a chart showing a concept of a first adaption in which the initial value Ls is adapted based on the result from the first position R1 in a case of adapting the initial value to increase, and FIG. 8B is a chart showing the concept of the first adaption in which the initial value Ls is adapted based on the result from the first position R1 in a case of adapting the initial value to decrease. FIG. 9 is a chart showing a concept of a second adaption in which the gain G is adapted based on the result from the second position R2. FIG. 10 is a chart showing a concept of a third adaption in which the gain G is adapted based on the results from the second and third positions R2 and R3.

The adaption controller 524 compares the detected amount N$_{R1}$ of the first position R1 with the amount threshold Tha to perform the first adaption. The amount threshold Tha is a value with which a determination of whether the threshold level is substantially in match with the peak level of the sea surface reflection echo at each first position R1 is performed. For example, the amount threshold Tha is set to the value corresponding to 80% of the number of sweeps in the azimuth angle range Δθ. Note that, this value may suitably be set and changed.

When the detected amount N$_{R1}$ is above the amount threshold Tha (S301: YES), the adaption controller 524 updates the initial value Ls by adding a correction value δ$_L$ thereto (S302). When the detected amount N$_{R1}$ is large, as shown in FIG. 8A, it can be determined that the threshold level of the first position R1 is below the level of the main bang of the actual sea surface reflection echo. The correction value δ$_L$ is suitably set based on, for example, experience of the operator. Therefore, by adding the correction value δ$_L$ to the initial value Ls, the threshold level of the first position R1 can be increased to approach the level of the main bang of the actual sea surface reflection echo.

When the detected amount N$_{R1}$ is below the amount threshold Tha (S301: NO), the adaption controller 524 updates the initial value Ls by subtracting the correction value δ$_L$ therefrom (S303). When the detected amount N$_{R1}$ is small, as shown in FIG. 8B, it can be determined that the threshold level of the first position R1 is above the level of the main bang of the actual sea surface reflection echo. Therefore, by subtracting the correction value δ$_L$ from the initial value Ls, the threshold level of the first position R1 can be reduced to approach the level of the main bang of the actual sea surface reflection echo.

Next, the adaption controller 524 compares the detected amount N$_{R2}$ of the second position R2 with the amount threshold Thb to perform the second adaption. The amount threshold Thb is a value with which a determination of whether the threshold level is substantially in match with the peak level of the sea surface reflection echo at each second position R2 is performed. For example, the amount threshold Tha is set to the value corresponding to 80% of the number of sweeps in the azimuth angle range Δθ. Note that, this value may also suitably be set and changed.

When the detected amount N$_{R2}$ is above the amount threshold Thb (S304: YES), the adaption controller 524 updates the gain G by subtracting a correction value δ$_{G1}$ therefrom (S305). When the detected amount N$_{R2}$ is large, as shown in FIG. 9, it can be determined that the threshold level of the second position R2 is below the level of the main bang of the actual sea surface reflection echo. Therefore, by subtracting the correction value δ$_{G1}$ from the gain G, a tracking performance (attenuation characteristic) of the threshold level for the detection data level of each sampling position can be subsided. The threshold level of the second position R2 can be increased to approach the peak level of the actual sea surface reflection echo without changing the threshold level of the first position R1.

When the detected amount N$_{R2}$ is below the amount threshold Thb (S304: NO), the adaption controller 524 maintains the gain G.

Next, the adaption controller 524 compares the detected amount N$_{R2}$ of the second position R2 with the amount threshold Thc as well as the detected amount N$_{R3}$ of the third position R3 with the amount threshold Thd to perform the third adaption. The third adaption is included in the second adaption in the claims.

The amount threshold Thc is set to a predetermined value below the amount threshold Thb. The amount threshold Thc is a value with which a determination of whether the threshold level is excessively higher than the peak level of the sea surface reflection echo at each second position R2 is performed. For example, the amount threshold Thc is set to the value corresponding to 50% of the number of sweeps in the azimuth angle range Δθ. Note that, this value may also suitably be set and changed.

The amount threshold Thd is a value with which a determination of whether the threshold level is excessively higher than the peak level of the sea surface reflection echo at each third position R3 is performed. For example, the amount threshold Thd is set to the value corresponding to 50% of the number of sweeps in the azimuth angle range Δθ. Note that, this value may also suitably be set and changed.

When the detected amount $N_{R2}$ is below the amount threshold Thc and the detected amount $N_{R3}$ is below the amount threshold Thd (S306: YES), the adaption controller 524 updates the gain G by adding a correction value $\delta_{G2}$ thereto (S307).

When both the detected amounts $N_{R2}$ and $N_{R3}$ are small, as shown in FIG. 10, it can be determined that the threshold levels of the second and third positions R2 and R3 are excessively higher than the echo level of the actual sea surface reflection echo. In other words, it can be determined that the tracking performance of the threshold level to the actual sea surface reflection echo is not sufficient. Therefore, by adding the correction value $\delta_{G2}$ to the gain G, the tracking performance of the threshold level of each sampling position for the detection data level can be improved. Note that, here, the correction value $\delta_{G2}$ is set below the correction value $\delta_{G1}$. Thus, the threshold levels of the second and third positions R2 and R3 can be increased to approach the peak level of the actual sea surface reflection echo without changing the threshold level of the first position R1.

When the detected amount $N_{R2}$ is above the amount threshold Thc or the detected amount $N_{R3}$ is above the amount threshold Thd (S306: NO), the adaption controller 524 maintains the gain G.

By performing the above processing, the threshold level of each sampling position can be adapted to substantially match with the envelope of the sea surface reflection echoes in the actual state of the sea.

By performing such adaption of the threshold curve for every sweep, the sea surface reflection suppression threshold level suitable for each azimuth (sweep) can be set. Moreover, by performing the adaption of the threshold level of each sampling position in every scan, the sea surface reflection suppression threshold level can be set according to the state of the sea.

By using the threshold level determined as above, the target object detector 16 suppresses a sea clutter component which is an unnecessary component included in the detection data, and generates the detection image data. Specifically, the target object detector 16 suppresses the unnecessary component by subtracting the threshold level from the detection data level at each sampling position.

Figure 11A:
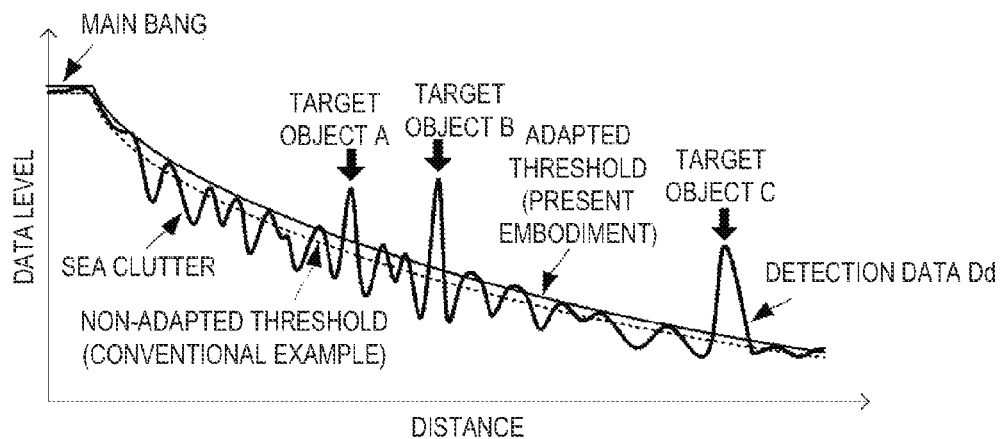
FIGS. 11A, 11B, and 11C are charts showing differences in the detection data between a case of using the configuration and processing of the first embodiment and a case of using the configuration and processing of the conventional example.
Figure 11B:
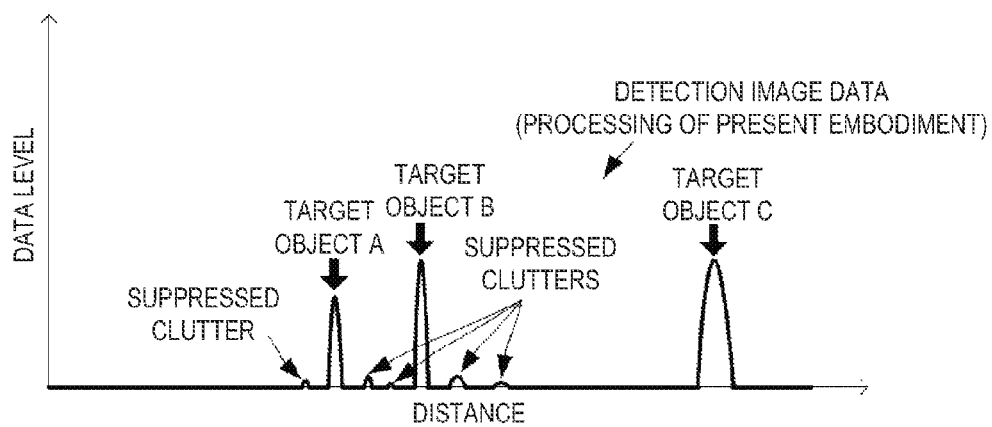
Figure 11C:
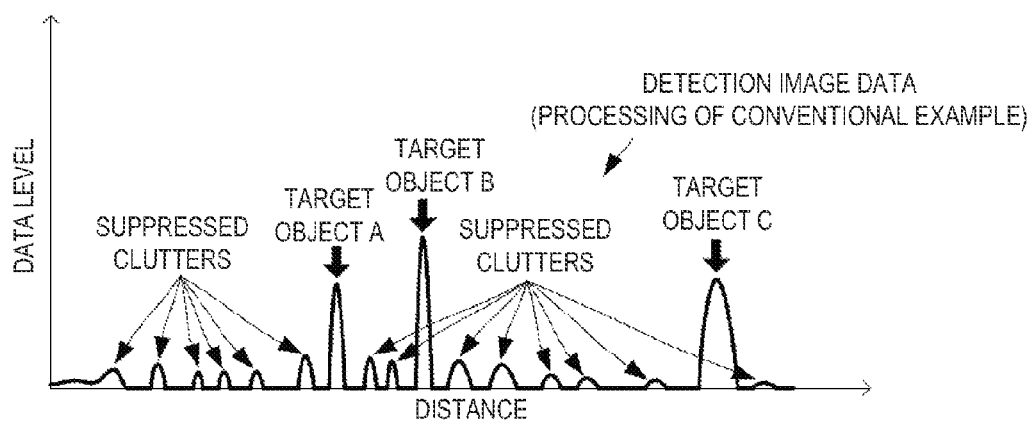

FIGS. 11A to 11C are charts showing differences in detection image data between when the configuration and processing of this embodiment are used and when the conventional configuration and processing are used, in which FIG. 11A is the chart showing setting states of the threshold level on the detection data of a certain sweep of this embodiment and the conventional example, FIG. 11B is the chart showing the detection image data level when the processing of this embodiment is performed, and FIG. 11C is the chart showing the detection image data level when the conventional processing is performed.

As shown in FIG. 11A, by using the configuration and processing of this embodiment, the threshold level substantially matches the peak level of the sea clutter component of the detection data at each sampling position. On the other hand, with the conventional configuration and processing, the threshold level is set lower than the peak level of the sea clutter component of the detection data at each sampling position.

Therefore, when using the threshold level determined with the conventional configuration and processing, as shown in FIG. 11C, many sea clutter components still remain even after the suppression processing.

However, by using the threshold level determined by the configuration and processing of this embodiment, as shown in FIG. 11B, almost all the sea clutter components can be suppressed, and even at the position where the sea clutter component still remains, the amplitude level of the sea clutter component is extremely low. On the other hand, the echo levels of target objects A, B and C are above a predetermined amplitude level.

Here, in this embodiment, the sea clutter component is sufficiently suppressed low and approaches to zero (0). Therefore, a detection image can be obtained, where the target objects A, B and C can be distinguished clearly compared to the conventional configuration. Moreover, even if the amplitude levels of the echo levels of the target objects A, B and C are slightly reduced than the conventional configuration, since the level of the sea clutter component is sufficiently low, an S/N will be high as a result, and the target objects A, B and C can accurately be detected than with the conventional configuration.

In the above description, the example is shown, which the adaption of the threshold curve is performed based on the of detection data amount N of the amplitude level (data level) exceeding the threshold level $Th_L$; however, the adaption of the threshold level may be performed simply based on whether the detection data levels LDd of the observing sweep exceeds the threshold levels $Th_L$. Note that, since the level of the sea surface reflection echo is unstable, and the set position (sampling position) may not correspond to the peak level of the sea surface reflection echo, the adaption of the threshold level of each sampling position can be performed more stably by performing the adaption of the threshold curve based on the data amount obtained based on the detection data levels in the predetermined range. In addition to the first, second, and third adaptions described above, the following fourth adaption may also be performed.

Figure 12:
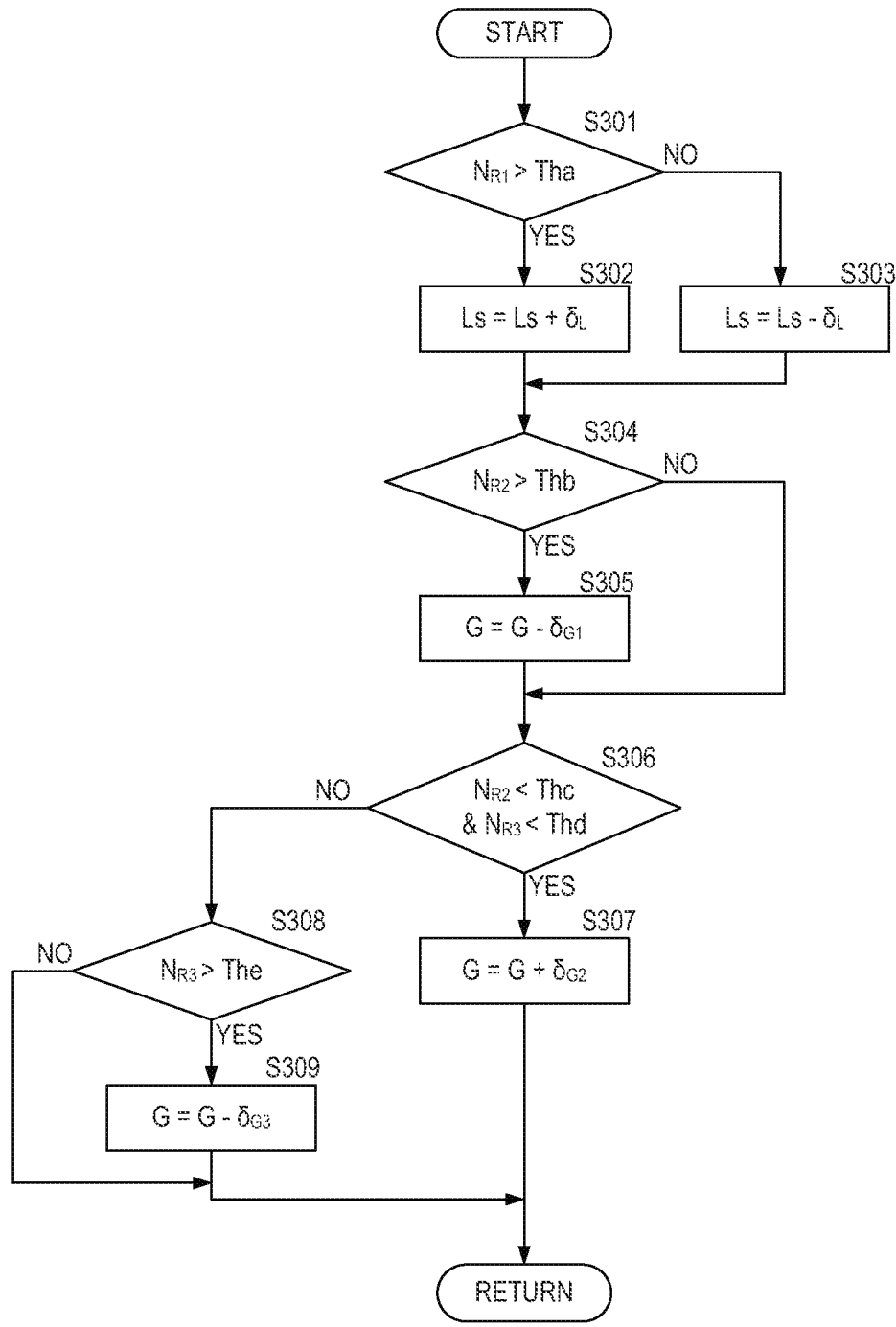
FIG. 12 is a flowchart showing a flow of updating the threshold curve by the adaption controller 524, including a fourth adaption.
Figure 13:
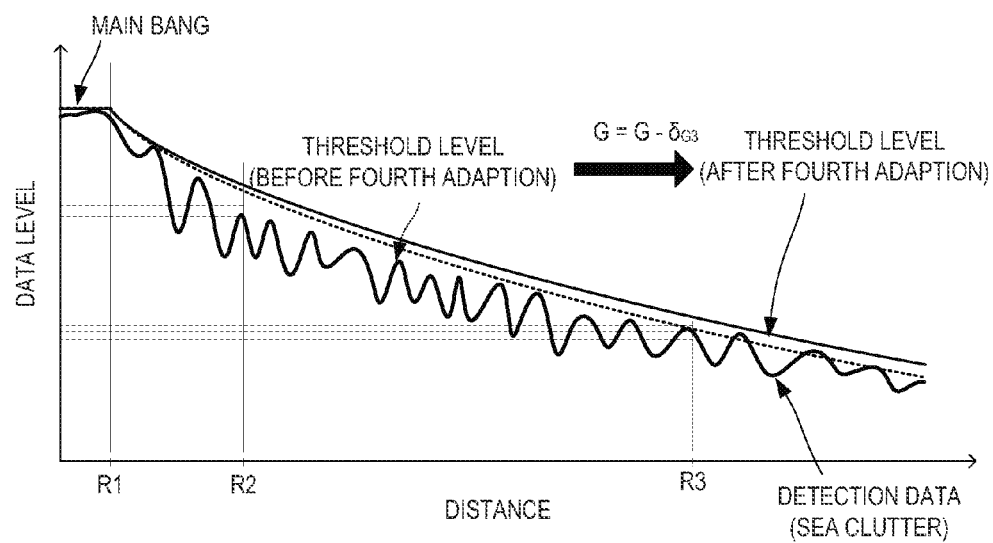
FIG. 13 is a chart showing a concept of the fourth adaption in which the gain G is adapted based on the result from the third position R3.

FIG. 12 is a flowchart showing a flow of updating the threshold level by the adaption controller 524, including the fourth adaption. FIG. 13 is a chart showing a concept of the fourth adaption in which the gain G is adapted based on the result from the third position R3. The flow shown in FIG. 12 indicates processing that is performed when the result of the third adaption at S306 in the flow shown in FIG. 7 is "NO." Therefore, the description of the first, second, and third adaptions is omitted, and only the processing after the result at S306 came out as "NO", where the third adaption is performed is described.

When the detected amount $N_{R2}$ is above the amount threshold Thc or the detected amount $N_{R3}$ is above the amount threshold Thd (S306: NO), the adaption controller 524 performs the fourth adaption by comparing the detected amount $N_{R3}$ of the third position R3 with an amount threshold Thc.

The amount threshold Thc is set to a predetermined value above the amount threshold Thd. The amount threshold Thc is a value with which a determination of whether the threshold level is lower than the peak level of the sea surface reflection echo at each third position R3 is performed. For example, the amount threshold Thc is set to the value corresponding to 70% of the number of sweeps in the azimuth angle range Δθ. Note that, this value may also suitably be set and changed within the scope where the relation with the amount threshold Thd is kept.

When the detected amount $N_{R3}$ is below the amount threshold Thc (S308: YES), the adaption controller 524 updates the gain G by subtracting a correction value $\delta_{G3}$ therefrom (S309).

When the detected amount $N_{R3}$ is large, as shown in FIG. 13, it can be determined that the threshold level of the third position R3 is below the echo level of the actual sea surface reflection echo. Therefore, by subtracting the correction value $\delta_{G3}$ from the gain G, the tracking performance of the threshold level for the detection data level can be subsided. Here, the correction value $\delta_{G3}$ of the gain G is set smaller than the correction value $\delta_{G1}$. Thus, the threshold level of the third position R3 can be increased to approach the peak level of the actual sea surface reflection echo by suppressing a change amount of the threshold level of the second position R2 without changing the threshold level of the first position R1.

When the detected amount $N_{R3}$ is below the amount threshold Thc (S306: NO), the adaption controller 524 maintains the gain G.

By adding such fourth adaption, the threshold level of each sampling position can be adapted further accurately to substantially match with the envelope of the sea surface reflection echoes in the actual state of the sea.

Next, a radar apparatus using a threshold setting method according to a second embodiment of the invention is described with reference to the appended drawings. The radar apparatus according to this embodiment uses a different method for the threshold setting, and other configuration and processing thereof are the same as the radar apparatus of the first embodiment. Therefore, only the part of the threshold setting method that is different from the first embodiment is described in detail.

Figure 14:
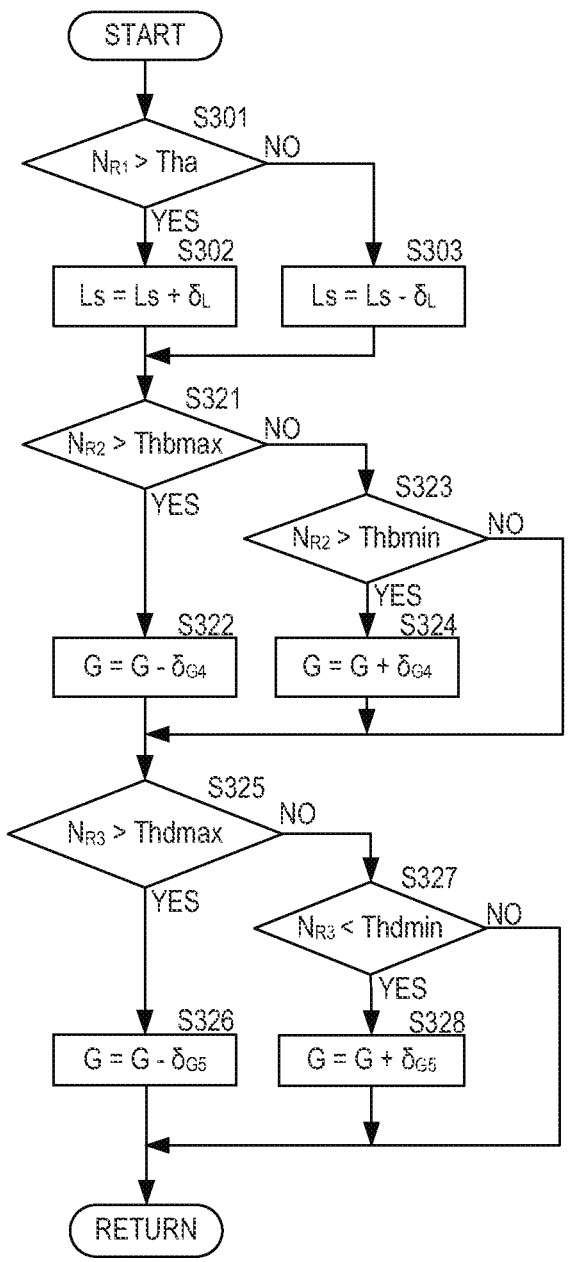
FIG. 14 is a flowchart showing the threshold setting method according to a second embodiment of the invention.
Figure 15:
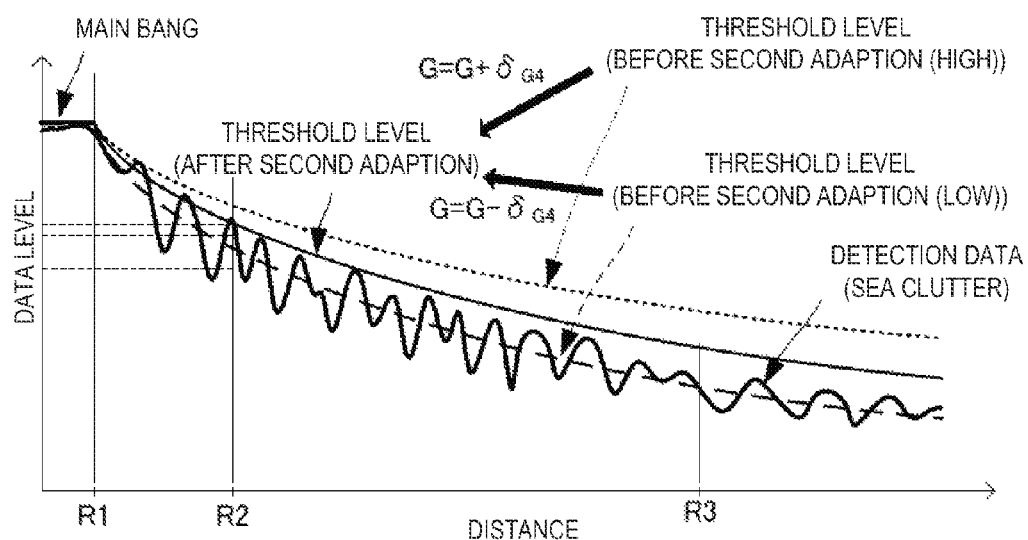
FIG. 15 is a chart showing a concept of a second adaption in which the gain G is adapted based on the result from the second position R2 in the second embodiment.
Figure 16:
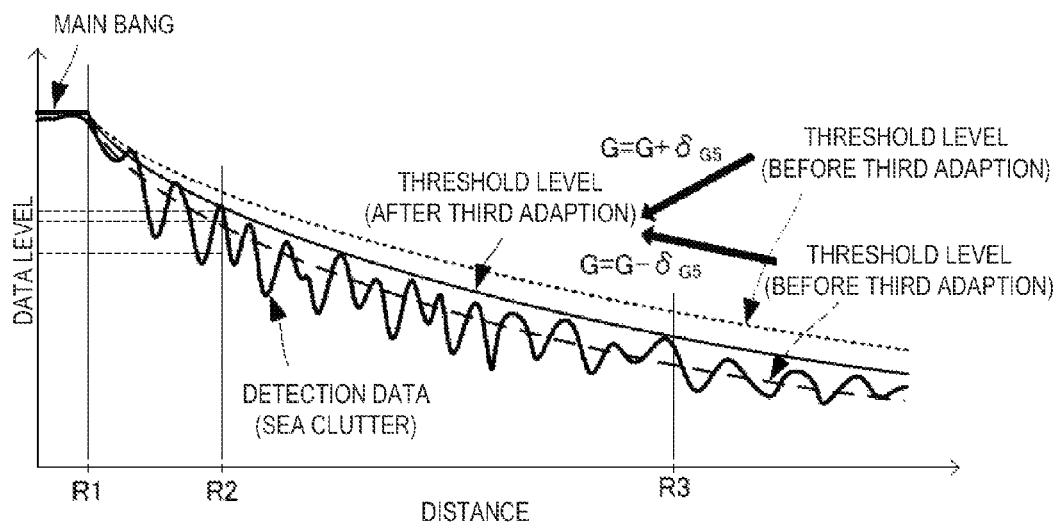
FIG. 16 is a chart showing a concept of a third adaption of adapting the gain G based on the result from the third position R3 in the second embodiment.

FIG. 14 is a flowchart showing the threshold setting method according to the second embodiment of the invention. FIG. 15 is a chart showing a concept of a second adaption in which the gain G is adapted based on the result from the second position R2 in the second embodiment. FIG. 16 is a chart showing a concept of a third adaption in which the gain G is adapted based on the result from the third position R3 in the second embodiment.

The threshold setting device 15 compares the detected amount $N_{R1}$ of the first position R1 with the amount threshold Tha. When the detected amount $N_{R1}$ is above the amount threshold Tha, in other words, $N_{R1}$>Tha (S301: YES), the threshold setting device 15 updates the initial value Ls by adding the correction value $\delta_L$ thereto (S302). When the detected amount $N_{R1}$ is below the amount threshold Tha, in other words, $N_{R1}$≤Tha (S301: NO), the threshold setting device 15 updates the initial value Ls by subtracting the correction value $\delta_L$ therefrom (S303). The adaption on the initial value is performed as same as the first embodiment.

The threshold setting device 15 compares the detected amount $N_{R2}$ of the second position R2 with a maximum amount threshold Thbmax and a minimum amount threshold Thbmin, respectively. The maximum amount threshold Thbmax is a value obtained by adding a predetermined value to the amount threshold Thb of the first embodiment, for example, the maximum amount threshold Thbmax is the value corresponding to substantially 100% of the number of sweeps in the azimuth angle range $\Delta\theta$, in other words, the value indicating a state where the levels of the sea surface reflection echoes at almost all the second positions R2 in the azimuth range are above the threshold level. The minimum amount threshold Thbmin is a value obtained by subtracting a predetermined value from the amount threshold Thb of the first embodiment, for example, the minimum amount threshold Thbmin is the value corresponding to substantially below 50% of the number of sweeps in the azimuth angle range $\Delta\theta$, in other words, the value indicating a state where only less than half of the levels of the sea surface reflection echoes of the second positions R2 in the azimuth range are above the threshold level. Moreover, an amount range set by the maximum amount threshold Thbmax and the minimum amount threshold Thbmin corresponds to "the second amount range." These maximum amount threshold Thbmax and minimum amount threshold Thbmin can suitably be set and changed according to the state of the sea, the setting of the second position R2, the power of the pulse-shaped signal, etc.

When the detected amount $N_{R2}$ is above the maximum amount threshold Thbmax, in other words, $N_{R2}$>Thbmax (S321: YES), the threshold setting device 15 updates the gain G by subtracting a correction value $\delta_{G4}$ therefrom (S322). By performing this processing, when the threshold level is lower than the amplitude level of the sea surface reflection echo in the actual state of the sea at almost all of the plurality of second positions R2 in the azimuth range, the tracking performance of the threshold level with respect to the detection data level can be subsided. Thus, the threshold level of the sampling position is adapted to increase so as to match with the actual sea surface reflection echo level.

When the detected amount $N_{R2}$ is below the maximum amount threshold Thbmax, in other words, $N_{R2}$≤Thbmax (S321: NO), the threshold setting device 15 compares the detected amount $N_{R2}$ with the minimum amount threshold Thbmin.

When the detected amount $N_{R2}$ is below the minimum amount threshold Thbmin, in other words, $N_{R2}$<Thbmin (S323: YES), the threshold setting device 15 updates the gain G by adding the correction value $\delta_{G4}$ thereto (S324). By performing this processing, when the threshold level is not lower than the amplitude level of the sea surface reflection echo in the actual state of the sea at almost all of the plurality of second positions R2 in the azimuth range, the tracking performance of the threshold level with respect to the detection data level can be improved. Thus, the threshold level of the sampling position is adapted to reduce so as to match with the actual sea surface reflection echo level.

When the detected amount $N_{R2}$ is above the minimum amount threshold Thbmin, in other words, $N_{R2}$≥Thbmin (S323: NO), the threshold setting device 15 maintains the gain G. By performing this processing, when the threshold levels of the plurality of second positions R2 in the azimuth range are almost the same as the sea surface reflection echoes in the actual state of the sea, the threshold level of each sampling position can be maintained, in other words, the tracking performance of the threshold level for the detection data level can be remained unchanged.

By performing such processing, as shown in FIG. 15, when the threshold levels are lower than the envelope of the sea surface reflection echoes in the actual state of the sea (in the case of the broken line of FIG. 15), as indicated by the solid line of FIG. 15, the correction of subsiding the tracking performance of the threshold level for the detection data level can be performed to follow along the envelope of the sea surface reflection echoes in the actual state of the sea.

When the threshold levels are higher than the envelope of the sea surface reflection echoes in the actual state of the sea (in the case of the dotted line of FIG. 15), as indicated by the solid line of FIG. 15, the correction of improving the tracking performance of the threshold level for the detection data level can be performed to follow along the envelope of the sea surface reflection echoes in the actual state of the sea.

When the threshold levels substantially matches with the envelope of the sea surface reflection echoes in the actual state of the sea, the threshold levels can be maintained.

The threshold setting device 15 compares the detected amount $N_{R3}$ of the third position R3 with a maximum amount threshold Thcmax and a minimum amount threshold Thcmin. The maximum amount threshold Thcmax is a value obtained by adding a predetermined value to the amount threshold Thc of the first embodiment, for example, the maximum amount threshold Thcmax is the value corresponding to substantially 100% of the number of sweeps in the azimuth angle range $\Delta\theta$, in other words, the value indicating a state where the levels of the sea surface reflection echoes at almost all the third positions R3 in the azimuth range are above the threshold level.

The minimum amount threshold Thcmin is a value obtained by subtracting a predetermined value from the amount threshold Thc of the first embodiment, for example, the minimum amount threshold Thcmin is the value corresponding to substantially below 50% of the number of sweeps in the azimuth angle range $\Delta\theta$, in other words, the value indicating a state where only less than half of the levels of the sea surface reflection echoes of the third positions R3 in the azimuth range are above the threshold level. Moreover, an amount range set by the maximum amount threshold Thcmax and the minimum amount threshold Thcmin corresponds to "the third amount range." These maximum amount threshold Thcmax and minimum amount threshold Thcmin can also suitably be set and changed according to the state of the sea, the setting of the third position R3, the power of the pulse-shaped signal, etc.

When the detected amount $N_{R3}$ is above the maximum amount threshold Thcmax, in other words, $N_{R3}$>Thcmax (S325: YES), the threshold setting device 15 updates the gain G by subtracting a correction value $\delta_{G5}$ therefrom (S326). The correction value $\delta_{G5}$ is preferred to be smaller than the correction value $\delta_{G4}$ for the second position R2.

By performing this processing, when the threshold level is lower than the echo level of the sea surface reflection echo in the actual state of the sea at almost all of the plurality of third positions R3 in the azimuth range, the tracking performance of the threshold level for the detection data level can be subsided. Thus, the threshold level of the sampling position is adapted to increase so as to match with the actual sea surface reflection echo level.

When the detected amount $N_{R3}$ is below the maximum amount threshold Thcmax, in other words, $N_{R3} \leq$Thcmax (S325: NO), the threshold setting device 15 compares the detected amount $N_{R3}$ with the minimum amount threshold Thcmin.

When the detected amount $N_{R3}$ is below the minimum amount threshold Thcmin, in other words, $N_{R3}$<Thcmin (S327: YES), the threshold setting device 15 updates the gain G by adding the correction value $\delta_{G5}$ thereto (S328). By performing this processing, when the threshold level is not lower than the amplitude level of the sea surface reflection echo in the actual state of the sea at almost all of the plurality of third positions R3 in the azimuth range, the tracking performance of the threshold level for the detection data level can be improved. Thus, the threshold level of the sampling position is adapted to reduce so as to match with the actual sea surface reflection echo level.

When the detected amount $N_{R3}$ is above the minimum amount threshold Thcmin, in other words, $N_{R3} \geq$Thcmin (S327: NO), the threshold setting device 15 maintains the gain G. By performing this processing, when the threshold levels of the plurality of third positions R3 in the azimuth range are almost the same as of the sea surface reflection echo level in the actual state of the sea, the threshold level of the sampling position can be maintained. Thus, the threshold level of the sampling position is maintained in a state of substantially matching with the actual sea surface reflection echo level.

By performing such processing, as shown in FIG. 15, when the threshold curve is lower than the envelope of the sea surface reflection echoes in the actual state of the sea (in the case of the broken line of FIG. 15), as indicated by the solid line of FIG. 15, the correction of subsiding an attenuation characteristic of the threshold curve can be performed to track along the envelope of the sea surface reflection echoes in the actual state of the sea.

When the threshold curve is higher than the envelope of the sea surface reflection echoes in the actual state of the sea (in the case of the dotted line of FIG. 15), as indicated by the solid line of FIG. 15, the correction of enhancing the attenuation characteristic of the threshold curve can be performed to track along the envelope of the sea surface reflection echoes in the actual state of the sea.

When the threshold curve substantially matches with the envelope of the sea surface reflection echoes in the actual state of the sea, the threshold level can be maintained.

As described above, by using the threshold setting method of this embodiment, the threshold curve can be adapted to track the envelope of the sea surface reflection echoes in the actual state of the sea. Particularly, as described in this embodiment, by using the results from the second and third positions R2 and R3 which are different in the distance direction, the threshold curve can be adapted accurately to track the envelope of the sea surface reflection echoes in the actual state of the sea.

Further in this embodiment, when the envelope of the sea surface reflection echoes is similar to the threshold level, since the threshold level is maintained, the threshold level does not unnecessarily move up and down, and the threshold level stably tracking the envelope of the sea surface reflection echoes can be achieved.

In this embodiment, the example of adjusting the attenuation characteristic of the threshold curve based on the results from the second and third positions R2 and R3 is shown; however, the attenuation characteristic of the threshold curve may be adjusted based on only the second position R3.

In the first embodiment, the example of dividing all the azimuths of the ship 90 into a plurality of azimuth ranges is shown. For example, in the case shown in FIG. 2, the azimuths are divided into a forward azimuth range AR0, a right-hand forward azimuth range AR1, a right-hand azimuth range AR2, a rearward azimuth range AR3, a left-hand azimuth range AR4, and a left-hand forward azimuth range AR5, with respect to the ship 90. In this case, the amount threshold may be set for the azimuth ranges individually. This dividing example is merely an example, and it may be divided into more details, or all the azimuths may be set as one range.

In the first embodiment, the example of setting the first position R1 to be near the farther end of the main bang is shown. In this case, the threshold level of the first position R1 may be adopted for the section of the main bang. In the second embodiment, the example of adapting the threshold curve for each sweep is shown; however, by commonly using the threshold curve between sweeps at a predetermined sweep interval, the threshold curve may be adapted at the predetermined sweep interval. Moreover, the example of adapting the threshold curve for each sweep is shown; however, the threshold curve may be adapted for a plurality of scans simultaneously. With these methods, the load on the adaption can be reduced.

The adaption is performed using the detection data of the positions aligned in the distance direction; however, the adaption may also be performed using the detection data of positions close to each other in the distance direction.

The example of using the detection data of two positions for the adaption of the gain G is shown; however, it may be three positions or more, and the adaption may also be performed using the data of one position. Note that, by using the plurality of positions (e.g., about two positions), the gain G with which a predetermined accuracy according to the sea surface reflection is obtained can be set with comparatively simple processing, and it is more effective.

Moreover, in the above description, a case where a target object (e.g., a land) exists in a sea surface reflection area is not particularly described; however, when the land exists at the second or third position, the land may be detected separately, and it may be set to be excluded from the target object candidate of the adaption. Further, the second or third position may be shifted in its position in the distance direction.

In the above description, the radar apparatus for transmitting radio waves while rotating the antenna is described as an example; however, the above processing and configuration may also be applied to other devices for performing a target object detection by transmitting other kinds of detection signals and based on echo signals thereof. Particularly, if an unnecessary component of which an amplitude level has a tendency of decreasing as the distance from a transmitted position of the detection signal is farther is included in the echo signals, the effect of the above configuration and processing will exert more effectively. Specifically, not limiting to the radar apparatus, the present invention can be applied widely to target object detection devices for performing a target object detection by using detection data including unnecessary components having the amplitude characteristic as described above.

In the above description, the example of realizing the threshold setting by the respective functional parts is shown; however, the above threshold setting can be performed by programming the processing corresponding to the flowcharts shown in FIGS. 3, 7 and 12, storing it in, for example, a memory, and reading out to perform the program by a computer. Moreover, a target object detection may be performed by programming the operation of the target object detector 16 and performing it along with the threshold setting.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A target object detection device, comprising:
   a transmitter for transmitting at least one transmission wave in a predetermined azimuth from a transmission source thereof at a predetermined cycle;
   an echo signal receiver for receiving echo signals of the transmission waves from one or more target objects at the cycle;
   an echo signal suppressor for suppressing levels of the echo signals corresponding to sampling positions every time the echo signals are received at the cycle, by using setting of amplitude level suppression values of the echo signals based on thresholds for the sampling positions that are set in association with distances from the transmission source;
   a target object detector for detecting the one or more target objects based on the level-suppressed echo signals;
   a first updater for comparing one or more amplitude levels of echo signals of sampling positions within a first area corresponding to a first distance from the transmission source, with the threshold that is set in association with the first distance, and determining to update the values with a new threshold and a new suppression value for each sampling position corresponding to the first distance based on the comparison result; and
   a second updater for comparing one or more amplitude levels of echo signals of sampling positions corresponding to a second distance that is farther than the first distance from the transmission source, with the threshold that is set in association with the second distance, and determining to update the values with a new threshold and a new suppression value for each sampling position located farther than the first distance based on the comparison result and a relation with the threshold for each sampling position located farther than the first area.

2. The target object detection device of claim 1, wherein the first updater compares amplitude levels of echo signals of a plurality of sampling positions within the first area including the one or more sampling positions at the first distance, with the thresholds for the plurality of sampling positions, respectively, and determines the new threshold and suppression value for each sampling position at the first distance, and
   wherein the second updater compares amplitude levels of echo signals of a plurality of sampling positions within a second area including the one or more sampling positions corresponding to the second distance, with the thresholds for the plurality of sampling positions, respectively, and determines the new threshold and suppression value for each sampling position located farther than the first distance.

3. The target object detection device of claim 2, wherein the transmission source transmits the transmission waves at a transmission cycle shorter than the predetermined cycle while changing the transmission azimuth, the transmission azimuth including the predetermined azimuth,
   wherein the plurality of sampling positions within the first area include a plurality of sampling positions at the first distance, and
   wherein the plurality of sampling positions within the second area include a plurality of sampling positions at the second distance.

4. The target object detection device of claim 2, wherein in the threshold determination by the first updater, each of the amplitude levels of the echo signals of the plurality of sampling positions within the first area is compared with the threshold for the corresponding sampling position, the number of sampling positions exceeding the threshold is counted to obtain a first counted number, and the threshold and suppression value for each sampling position at the first distance are updated based on the first counted number, and
   wherein in the threshold determination by the second updater, each of the amplitude levels of the echo signals of the plurality of sampling positions within the second area is compared with the threshold for the corresponding sampling position, the number of sampling positions exceeding the threshold is counted to obtain a second counted number, and the threshold and suppression value for each sampling position at the second distance are updated based on the second counted number.

5. The target object detection device of claim 4, wherein the first updater sets the threshold and suppression value for each sampling position at the first distance to be larger as the first counted number is larger, and
wherein the second updater sets the threshold and suppression value for each sampling position within the second area to approach an amplitude level of an echo signal corresponding thereto.

6. The target object detection device of claim 1, wherein the second updater includes a primary IIR filter for determining a gain based on the comparison result, passing each echo signal of the sampling position within the second area therethrough, and setting the threshold and suppression value for the sampling position.

7. The target object detection device of claim 4, further comprising a third updater for comparing one or more amplitude levels of echo signals of sampling positions corresponding to a third distance that is farther than the second distance from the transmission source, with the threshold that is set in association with the third distance, and determining to update the values with a new threshold and a new suppression value for each sampling position within a third area located farther than the second distance based on the comparison result and a relation with the threshold for each sampling position located farther than the second distance.

8. The target object detection device of claim 7, wherein the third updater includes a primary IIR filter for determining a gain based on the comparison results obtained by the second and third updaters, passing each echo signal of the sampling position located farther than the first distance therethrough, and setting the threshold and suppression value for the sampling position.

9. The target object detection device of claim 1, wherein the suppression of the echo signal is performed using the threshold for each sampling position as the suppression value for the sampling position.

10. The target object detection device of claim 1, further comprising:
an antenna for transmitting pulse waves while rotating at the predetermined cycle as the transmission source; and
a display unit for displaying the one or more target objects detected based on the echo signals obtained from the suppression.

11. A method of processing an echo signal, comprising:
transmitting a transmission wave in a predetermined azimuth from a transmission source at a predetermined cycle, wherein the transmission source is an antenna for transmitting pulse waves while rotating at the predetermined cycle;
receiving echo signals of the transmission waves from one or more target objects at the cycle via the antenna;
suppressing levels of the echo signals corresponding to sampling positions every time the echo signals are received, by using setting of amplitude level suppression values of the echo signals, based on thresholds for the sampling positions that are set in association with distances from the transmission source;
wherein the setting of amplitude suppression values includes:
comparing one or more amplitude levels of echo signals of sampling positions within a first area corresponding to a first distance from the transmission source, with the threshold that is set in association with the first distance, and determining to update the values with a new threshold and a new suppression value for each sampling position corresponding to the first distance based on the comparison result; and
comparing one or more amplitude levels of echo signals of sampling positions corresponding to a second distance that is farther than the first distance from the transmission source, with the threshold that is set in association with the second distance, and determining to update the values with a new threshold and a new suppression value for each sampling position located farther than the first distance based on the comparison result and a relation with the threshold for each sampling position located farther than the first area, and
using the new threshold and the new suppression value for each sampling position with a target object detector to generate detection image data and/or a determination result;
displaying the detection image data and/or determination result on a display.

12. The method of claim 11, wherein the determination of the new threshold and suppression value for each sampling position corresponding to the first distance includes comparing amplitude levels of echo signals of a plurality of sampling positions within the first area including the one or more sampling positions at the first distance, with the thresholds for the plurality of sampling positions, respectively, and determining the new threshold and suppression value for each sampling position at the first distance, and
wherein the determination of the new threshold and suppression value for each sampling position located farther than the first distance includes comparing amplitude levels of echo signals of a plurality of sampling positions within a second area including the one or more sampling positions corresponding to the second distance, with the thresholds for the plurality of sampling positions, respectively, and determining the new threshold and suppression value for each sampling position located farther than the first distance.

13. The method of claim 12, wherein the transmission source transmits the transmission waves at a transmission cycle shorter than the predetermined cycle while changing the transmission azimuth, the transmission azimuth including the predetermined azimuth,
wherein the plurality of sampling positions within the first area include a plurality of sampling positions at the first distance, and
wherein the plurality of sampling positions within the second area include a plurality of sampling positions at the second distance.

14. The method of claim 12, wherein the determination of the new threshold and suppression value for each sampling position corresponding to the first distance includes comparing each of the amplitude levels of the echo signals of the plurality of sampling positions within the first area with the threshold for the corresponding sampling position, counting the number of sampling positions exceeding the threshold to obtain a first counted number, and updating the threshold and suppression value for each sampling position at the first distance based on the first counted number, and
wherein the determination of the new threshold and suppression value for each sampling position located farther than the first distance includes comparing each of the amplitude levels of the echo signals of the plurality of sampling positions within the second area with the threshold for the corresponding sampling position, counting the number of sampling positions exceeding the threshold to obtain a second counted number, and updating the threshold and suppression value for each sampling position at the second distance based on the second counted number.

15. The method of claim 14, wherein the determination of the new threshold and suppression value for each sampling position corresponding to the first distance includes setting the threshold and suppression value for each sampling position at the first distance to be larger as the first counted number is larger, and wherein the determination of the new threshold and suppression value for each sampling position located farther than the first distance includes setting the threshold and suppression value for each sampling position in the second area to approach an amplitude level of an echo signal corresponding thereto.

16. The method of claim 11, wherein the determination of the new threshold and suppression value for each sampling position located farther than the first distance includes setting a gain of a primary IIR filter based on the comparison result, passing each echo signal of the sampling position located farther than the first distance through the primary IIR filter, and determining the threshold and suppression value for the sampling position.

17. The method of claim 11, further comprising comparing one or more amplitude levels of echo signals of sampling positions corresponding to a third distance that is farther than the second distance from the transmission source, with the threshold that is set in association with the third distance, and determining to update the values with a new threshold and a new suppression value for each sampling position within a third area located farther than the second distance based on the comparison result and a relation with the threshold for each sampling position located farther than the second distance.

18. The method of claim 17, further comprising:
setting a gain of a primary IIR filter based on the comparison results obtained by the determination of the new threshold and suppression value for each sampling position corresponding to the first distance and the determination of the new threshold and suppression value for each sampling position located farther than the first distance; and passing each echo signal of the sampling position located farther than the first distance through the primary IIR filter, and determining the threshold and suppression value for the sampling position.

19. The method of claim 11, wherein in the suppression processing of the echo signal, the threshold for each sampling position is used as the suppression value for the sampling position, and the level of the echo signal is subtracted by the threshold.

20. The method of claim 11, wherein the transmission source is an antenna for transmitting pulse waves while rotating at the predetermined cycle.

21. A target object detection device, comprising:
a transmitter for transmitting at least one transmission wave in a predetermined azimuth from a transmission source thereof at a predetermined cycle;
an echo signal receiver for receiving echo signals of the transmission waves from one or more target objects at the cycle;
an echo signal suppressor for suppressing levels of the echo signals corresponding to sampling positions every time the echo signals are received at the cycle, by using setting of amplitude level suppression values of the echo signals based on thresholds for the sampling positions that are set in association with distances from the transmission source;
a target object detector for detecting the one or more target objects based on the level-suppressed echo signals;
an updater for comparing one or more amplitude levels of echo signals of sampling positions within an area corresponding to a distance from the transmission source, with the threshold that is set in association with the distance, and determining to update the values with a new threshold and a new suppression value for each sampling position corresponding to the distance based on the comparison result.

* * * * *